United States Patent
Pachkov et al.

(10) Patent No.: US 11,159,627 B1
(45) Date of Patent: Oct. 26, 2021

(54) SEAMLESS REMOTE NETWORK REDIRECTION

(71) Applicant: Parallels International GmbH, Schaffhausen (CH)

(72) Inventors: Sergey Pachkov, Moscow (RU);
Alexey Koryakin, Moscow (RU);
Dmitry Skorodumov, Moscow (RU);
Nikolay Dobrovolskiy, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 0 days.

(21) Appl. No.: 16/744,367

(22) Filed: Jan. 16, 2020

Related U.S. Application Data (63) Continuation-in-part of application No. 15/789,224, filed on Oct. 20, 2017, now Pat. No. 10,581,636.

(51) Int. Cl.
*G06F 15/16* (2006.01)
*H04L 29/08* (2006.01)
*H04L 29/06* (2006.01)
*H04L 29/12* (2006.01)

(52) U.S. Cl.
CPC ............ *H04L 67/148* (2013.01); *H04L 61/20* (2013.01); *H04L 61/256* (2013.01); *H04L 67/40* (2013.01); *H04L 67/42* (2013.01); *H04L 61/6022* (2013.01)

(58) Field of Classification Search
CPC ..... H04L 67/148; H04L 61/20; H04L 61/256; H04L 67/40; H04L 67/42; H04L 61/6022
USPC ...................................................... 709/228
See application file for complete search history.

(56) References Cited

U.S. PATENT DOCUMENTS

| | | | | |
|---|---|---|---|---|
| 8,971,323 B2* | 3/2015 | Mithyantha | ............. | H04L 45/18 370/390 |
| 8,972,485 B1* | 3/2015 | French | .................. | G06F 9/5044 709/203 |
| 9,124,620 B2* | 9/2015 | Hochmuth | ............ | H04L 67/141 |
| 9,166,975 B2* | 10/2015 | Kuang | ................ | H04L 63/0838 |
| 9,374,337 B2* | 6/2016 | Rangaraman | ......... | H04L 61/103 |

(Continued)

OTHER PUBLICATIONS

G. Apostolopoulos and C. Hassapis, "V-eM: A Cluster of Virtual Machines for Robust, Detailed, and High-Performance Network Emulation," 14th IEEE International Symposium on Modeling, Analysis, and Simulation, Monterey, CA, USA, 2006, pp. 117-126, doi: 10.1109/MASCOTS.2006.51. (Year: 2006).*

(Continued)

*Primary Examiner* — Melvin H Pollack
(74) *Attorney, Agent, or Firm* — Rosenberg, Klein & Lee (57) ABSTRACT

Disclosed are systems and methods for seamlessly redirecting network data between a client and a remote server. In one exemplary aspect, the method comprises receiving, at a remote server, the network data via a first remote desktop protocol (RDP) channel, wherein the network data is encapsulated and transmitted by a client device configured to communicate with the remote server. The method further comprises replacing a MAC address listed in the network data with a MAC address of a logical network adapter on the remote server, and placing received network packets into a network driver of the logical network adapter, wherein the logical network adapter transfers received data in an operating system of the remote server such that a server-side application on the remote server receives network packets from the client device.

20 Claims, 9 Drawing Sheets

(56) References Cited

U.S. PATENT DOCUMENTS

| | | | |
|---|---|---|---|
| 9,742,682 B2* | 8/2017 | Jain | H04L 47/621 |
| 9,866,475 B2* | 1/2018 | Chauhan | H04W 4/50 |
| 9,973,468 B2* | 5/2018 | Nath | H04L 61/2076 |
| 10,044,607 B2* | 8/2018 | Chapman | H04L 45/66 |
| 10,044,612 B2* | 8/2018 | C J | H04L 12/4633 |
| 10,108,517 B1* | 10/2018 | Efremov | G06F 11/301 |
| 10,361,972 B2* | 7/2019 | Biruduraju | H04L 12/4633 |
| 10,389,635 B2* | 8/2019 | Jeganathan | H04L 45/586 |
| 10,484,336 B2* | 11/2019 | Kumar | H04L 61/1511 |
| 10,511,573 B2* | 12/2019 | Larson | H04L 29/12801 |
| 10,511,694 B2* | 12/2019 | Goyal | H04L 43/10 |
| 10,659,352 B2* | 5/2020 | Vairavakkalai | H04L 45/26 |
| 2015/0106420 A1* | 4/2015 | Warfield | H04L 41/5041 709/201 |
| 2016/0119165 A1* | 4/2016 | Keronen | H04L 67/2804 370/254 |
| 2018/0262388 A1* | 9/2018 | Johnson | G06Q 10/103 |

OTHER PUBLICATIONS

W. Wei, Y. Zhang, Y. Lu, P. Gao and K. Mu, "A VDI System Based on Cloud Stack and Active Directory," 2015 14th International Symposium on Distributed Computing and Applications for Business Engineering and Science (DCABES), Guiyang, China, 2015, pp. 151-154, doi: 10.1109/DCABES.2015.45. (Year: 2015).*

* cited by examiner

SEAMLESS REMOTE NETWORK REDIRECTION

CROSS-REFERENCE TO RELATED APPLICATIONS

This application is a continuation in part of U.S. Non-Provisional application Ser. No. 15/789,224 filed Oct. 20, 2017, which is herein incorporated by reference.

FIELD OF TECHNOLOGY

The present disclosure relates generally to the field of computing networking, more specifically, to systems and methods for seamless remote network redirection.

BACKGROUND

With virtual machine technology, a user can create and run multiple operating environments on a server at the same time. Each operating environment, or virtual machine, requires its own "guest" operating system (OS) and can run software applications independently from the other virtual machines. The VM software provides a layer between the computing, storage, and networking hardware and the software that runs on it.

Virtual machine technology provides many benefits as it can lower information technology (IT) costs through increased efficiency, flexibility and responsiveness. Each virtual machine acts as a separate environment that reduces risks and allows developers to quickly recreate different OS configurations or compare versions of applications designed for different OSs. Additional customer uses for VMs include cloud services, targeted production server consolidation, hosting of legacy applications (older versions), and computer or server backup. A frequent situation that arises in this context that a user often establishes a connection to a VM running in a datacenter, for example, to open a virtual desktop session.

There are several approaches for connecting a client computer (e.g., a laptop, a PC/Mac, a mobile/smartphone, a personal assistant device, etc.) to server network. These approaches are implemented by various products in the VPN market. However, the use of these methods is not affordable for a remote virtual desktop infrastructure (VDI) because virtual desktops usually do not have a direct connection with the client office network and require additional resources to maintain special control point on client-side and on remote-side. There is a need for enabling communication between a server and a client and for allowing a remote desktop to be part of a client network environment, and a client computer to be a part of remote network environment.

SUMMARY

A system and method is disclosed herein for seamlessly redirecting network data between a client and a remote server. In one exemplary aspect, the method comprises receiving, at a remote server, the network data via a first remote desktop protocol (RDP) channel, wherein the network data is encapsulated and transmitted by a client device configured to communicate with the remote server. The method further comprises replacing a MAC address listed in the network data with a MAC address of a logical network adapter on the remote server, and placing received network packets into a network driver of the logical network adapter, wherein the logical network adapter issues received data in an operation system of the remote server such that a server-side application on the remote server receives network packets from the client device.

In some aspects, the method comprises transmitting additional network data that originates from the server-side application to the client device via a second RDP channel, wherein the client device comprises a counterpart logical network adapter that parses the additional network data for access by a client-side application.

In some aspects, the method for transmitting further comprises publishing a port on the remote server, determining a session identifier of a new connection to the published port, gathering the additional network data on the published port and redirecting the additional network data into the second RDP channel.

In some aspects, the remote server is a remote access service (RAS) server and the client device is a RAS client.

In some aspects, the client device comprises a counterpart logical network adapter, and wherein the logical network adapter and the counterpart logical network adapter function in bridge mode such that the logical network adapter and the counterpart logical network adapter can join physically different networks while packet transmittal is handled via the RDP channel.

In some aspects, the client device comprises a counterpart logical network adapter, and wherein the logical network adapter and the counterpart logical network adapter function in network address translation (NAT) mode such that one of the logical network adapter and the counterpart logical network adapter will work in a separated network environment with access restrictions that allow only connections that started from an opposite side.

In some aspects, the first RDP channel between the remote server and the client device is over a wide area network (WAN).

A system and method is disclosed herein for exchanging network traffic between a client and a server-side virtual machine, and, more particularly, for tunneling the network traffic using a communication channel between the client and the server.

According to one aspect of the present disclosure, a method for exchanging network traffic between a client and a virtual machine is provided. The method includes emulating a virtual network interface controller (NIC) of a virtual machine executing on a physical server. The virtual NIC emulates access to a physical local area network of the physical server. The method further includes detecting a guest network packet at the virtual NIC to be transmitted to a client, and transmitting the guest network packet to the client using a communication channel between the physical server and the client without injecting the guest network packet into the local area network of the physical server.

In another aspect, the communication channel between the physical server and the client comprises a wide area network (WAN).

In another aspect, the method further includes establishing the communication channel between a server-side packet injection layer executing on the physical server and a client-side packet injection layer executing on the client.

In another aspect, the physical local area network is isolated from network access by the virtual machine.

In another aspect, the guest network packet is received by a client-side packet injection layer and is injected into a physical network interface of the client.

In another aspect, detecting the guest network packet at the virtual NIC to be transmitted to the client further includes intercepting a request to access a state of the virtual NIC by a network interface driver executing in the virtual machine.

According to another aspect of the present disclosure, a system for exchanging network traffic between a client and a virtual machine is provided. The system includes a physical network interface controller (NIC), and a processor. The processor is configured to emulate a virtual network NIC of a virtual machine corresponding to the physical NIC, wherein the virtual NIC emulates access to a physical local area network of the physical server. The processor is further configured to detect a guest network packet at the virtual NIC to be transmitted to a client, and transmit the guest network packet to the client using a communication channel between the physical server and the client without injecting the guest network packet into the local area network of the physical server.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for exchanging network traffic between a client and a virtual machine. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Exemplary aspects of the present disclosure provide techniques to isolate virtual machine (VM) networking to client-side while the VM is running in a virtualized environment in a datacenter. Usually a client may access a VM executing on a server via some network connection, and another connection is used at the datacenter-side to provide networking for a dedicated network for the VMs. It has been determined that, in many situations, a VM does not need to have access to a local network of the datacenter; but rather, only the client's local network must be available for the VM.

As such, exemplary aspects of the present disclosure effectively separates the functionality and roles of a conventional virtual network interface card (NIC) emulation that includes NIC hardware emulation and network packet injection to a physical network interface. According to an exemplary aspect, a packet injection layer is includes a component running on the server side and another component running on the client side. Network packets from the VM are packed into a communication channel between the server-side and client-side parts of the packet injection layer, i.e., without injection into a local network of the server. The transmitted packet is unpacked on the client side and injected into a physical network interface of the client machine. Accordingly, exemplary aspects keep the server-side local network isolated from network access by the VM and all VM connections to the network go through the client's host physical NIC.

Figure 1A:
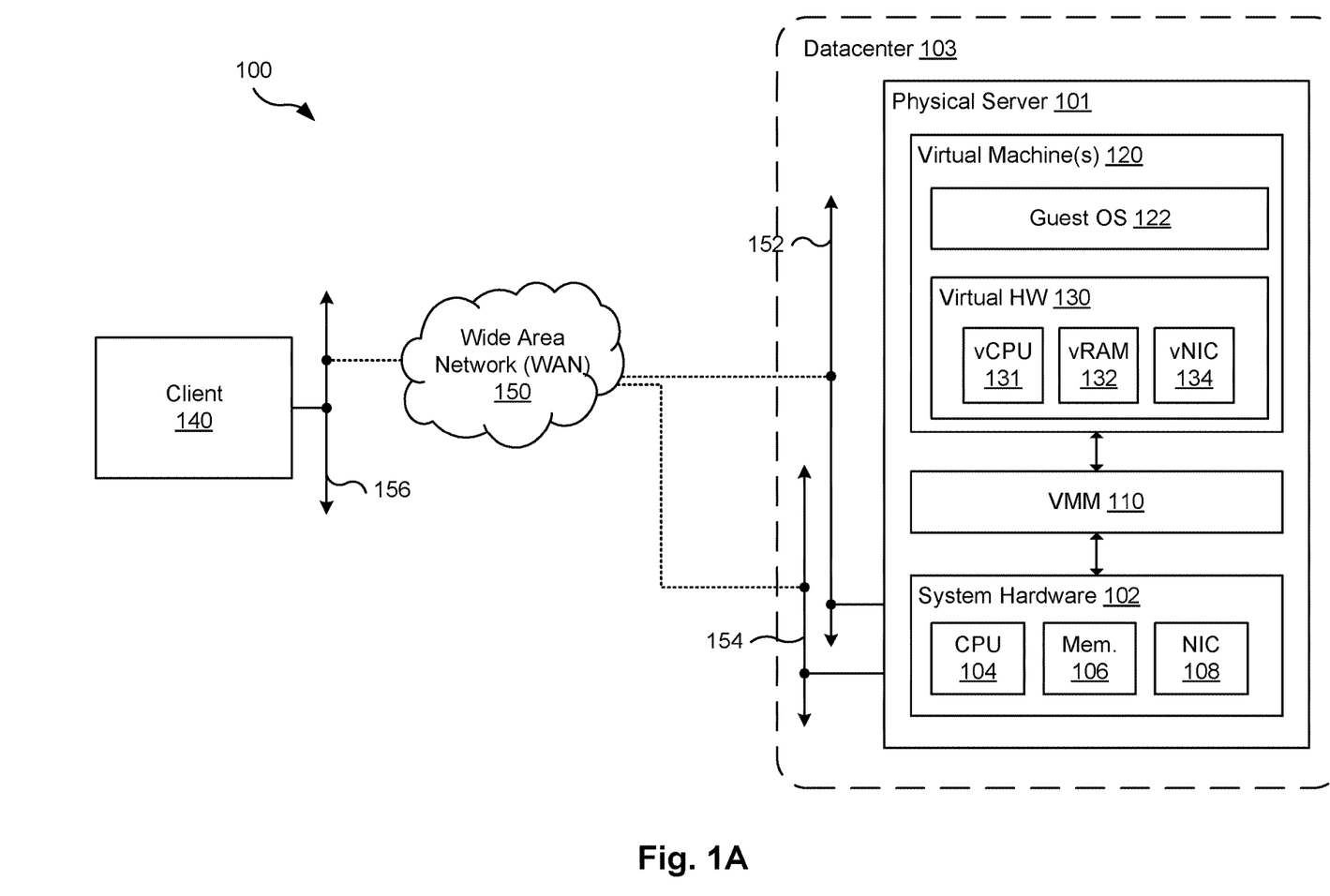
FIG. 1A illustrates a block diagram of a system for communicating with a server-side virtual machine across a wide area network.

FIG. 1A illustrates a block diagram of a system for communicating with a server-side virtual machine across a wide area network. As shown, the system 100 generally includes a client 140 communicatively connected to a datacenter 103 via a network, such as a Wide Area Network (WAN) 150. The datacenter 103 may include one or more physical servers 101, computers, or other computing devices.

Virtual machines 120 can be created on a host platform of the physical servers that includes system hardware 102 and a virtual machine monitor 110 (also known as a hypervisor, virtualizer, or VM controller). The virtual machine monitor 110 (hereinafter referred to as "VMM 110") provides a guest operating system 122 of the virtual machine 120 with a virtual operating platform (depicted as virtual hardware 130) and manages execution of the guest OS 122. The VMM 110 may run directly on the underlying system hardware 102 or as an application or component running within a host operating system (not shown) installed on the system hardware 102. While aspects of the present disclosure include a VMM-plus-hypervisor based embodiment, it is understood that aspects may be used for a hypervisor-based architecture or other virtual execution environment (VEE). In general, a VEE, according to an exemplary embodiment, can be any of a Virtual Private Server, a Virtual Machine, a Hypervisor-based Virtual Machine, a session of Terminal Server Windows 2003® (or older) and a session of Citrix Presentation Server®, VMM-based VMs or hypervisor-based VMs.

The computing system 101 may be a physical server, host, computer server, desktop, laptop, handheld device, or any other electronic device sufficient for implementing virtualization as described herein. As shown, the system hardware 102 of a host can include a computer processing unit (CPU) 104, memory 106 (e.g., random access memory), a network interface controller (NIC) 108, and storage devices (not shown). The system 100 may include additional devices, software modules, and the like, as would be appreciated to one skilled in the art, but are not shown herein so as to not unnecessarily obscure the aspects of the disclosure.

In one exemplary aspect, the virtual machine 120 includes virtual system hardware 130 and guest system software, including the guest OS 122. The VMM 110 acts as the interface between guest software executing within the VM 120, including one or more guest applications and guest OS 122, and the hardware components and devices in the underlying system hardware platform 102 of the host machine. The virtual system hardware 130 includes a virtual CPU 131, virtual memory 132, a virtual NIC 134, as well as other virtual hardware components, such as virtual disks and storage (not shown), and the like. It is noted that all of the virtual hardware components of the virtual machine 120 can be implemented in software to emulate corresponding physical components, as would be appreciated to on skilled in the art. For example, in some exemplary aspects, the virtual NIC 134 may include emulation for network controller hardware components of the physical NIC 108, including one or more registers, interrupts, queues, NIC functioning logic, and EEPROM.

Figure 1B:
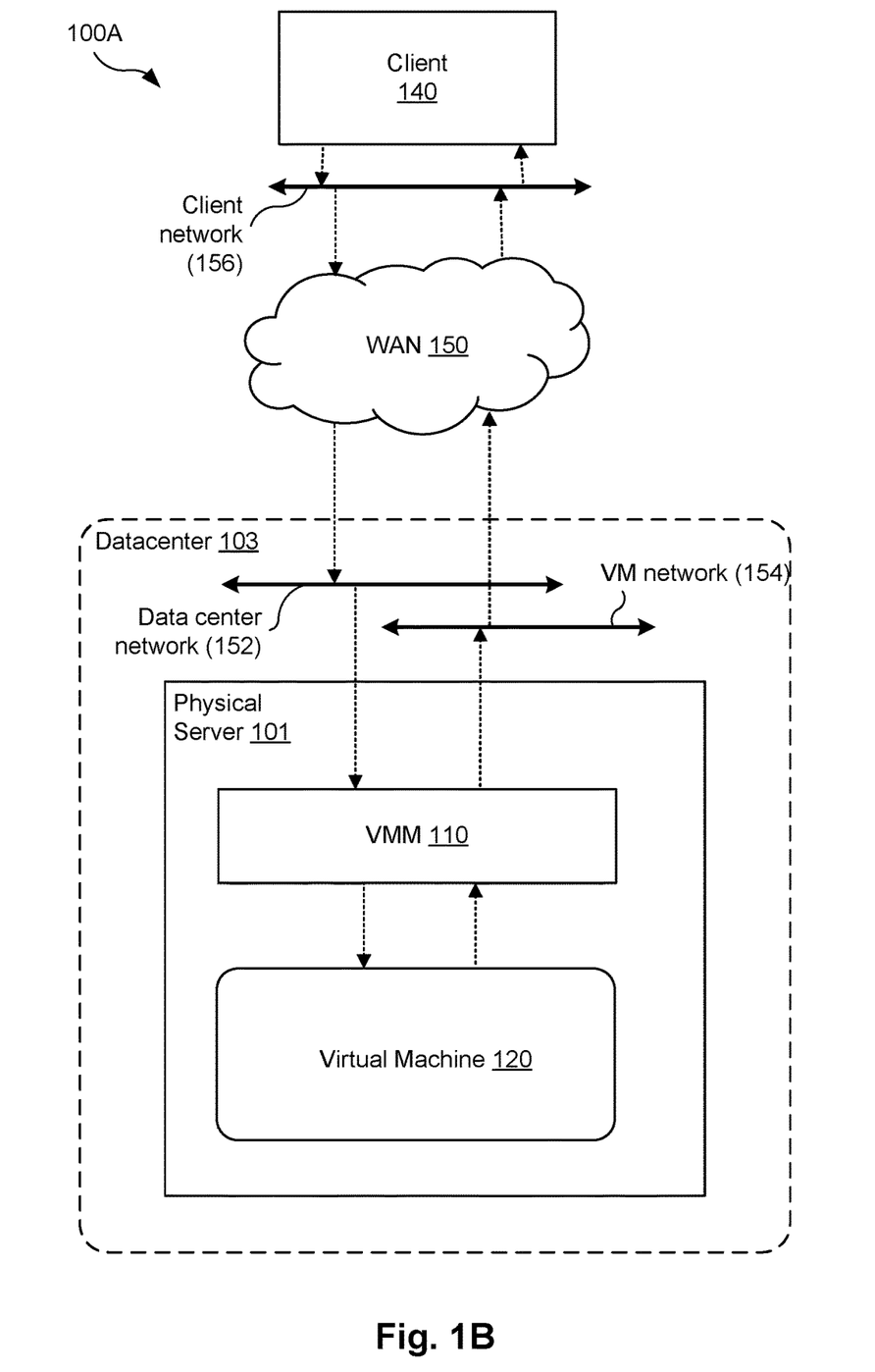
FIG. 1B illustrates a block diagram illustrating a network topology of the system in FIG. 1A.

FIG. 1B illustrates a block diagram illustrating a network topology 100A of the system 100 depicted in FIG. 1A. The client 140 may be configured to access one or more VMs 120 executing in the datacenter 103 via a client network 156 and the WAN 150. The datacenter 103 may include one or more networks 152, 154 that allows communications traffic between physical components (e.g., servers 101) in the datacenter 103, virtual components (e.g., virtual machines 120), as well as between components inside and outside of the datacenter 103, such as the WAN 150 and the client 140. The networks 152, 154, 156 may be arranged and maintained by configurations to one or more physical networking devices (not shown), including routers, gateways, switches, hubs, and virtual networking devices.

In some exemplary aspects, the WAN 150 is a network that spans a large geographic area (e.g., city, state, country, region, etc.). The WAN 150 may be used to connect networks together to allow communication between the networks, including network such as personal area networks, local area networks (LANs), campus area networks, and metropolitan area networks. In the aspect shown in FIG. 1B, the WAN 150 may facilitate communication between the client 140 and the datacenter 103, including communication between the client network 156, the datacenter network 152, and the VM network 154.

In some aspects, each of the computer networks in the datacenter 103 may be part of a network architecture that is partitioned into separate logical networks. In one example, the computer network 152 may be a datacenter network that provides a physical local area network (LAN) between all the physical servers 101 of the datacenter 103 (e.g., via NICs 108), and which may be communicatively connected to the WAN 150 outside of the datacenter 103. In another example, the computer network 154 may be a VM network that provides a local area network between two or more VMs 120 executing in the physical servers 101, which may include VMs executing in different physical servers.

During operation, the guest OS 122 executing in the virtual machine 120 may access a state of the virtual NIC 134 by modifying values in one of the virtual NIC's registers. For example, the guest OS 122 may write to a "TX Descriptor Tail" register of the virtual NIC 134 to signal that a new network packet is placed on a send queue of the NIC. This triggers a VM-related event, such as "VMEXIT", that transfers control from the guest software to the VMM 110. The VMM 110 handles the event by simulating behavior of the corresponding action and reflecting changes to particular emulated structures of the virtual NIC 134, such as updating the value of a data structure corresponding to the TX Descriptor Tail register. Packets or their addresses within memory are passed to the VMM 110 that manages and handles VM execution (e.g., in the host OS). The VMM 110 detects one or more guest network packets to be transmitted and passes the packets to a packet injection layer that writes the packets to NIC 108 for transmission on the VM network 154. Then, the packets are routed to the WAN and eventually to the client 140 via client network 156 using suitable techniques for network routing.

However, the approach depicted in FIG. 1B may have some drawbacks. In some cases, transmission of the guest network packets on the VM network 154 may unnecessarily expose the VM's network traffic to the local network of the datacenter 103, which can introduce network security issues. Similarly, the VM network traffic from the VMs 120 may interfere with the local network 154 of the datacenter 103. Accordingly, certain aspects of the present disclosure are configured to isolate VM networking to a client side while the VM is running in a virtualized environment in the datacenter 103.

Figure 2:
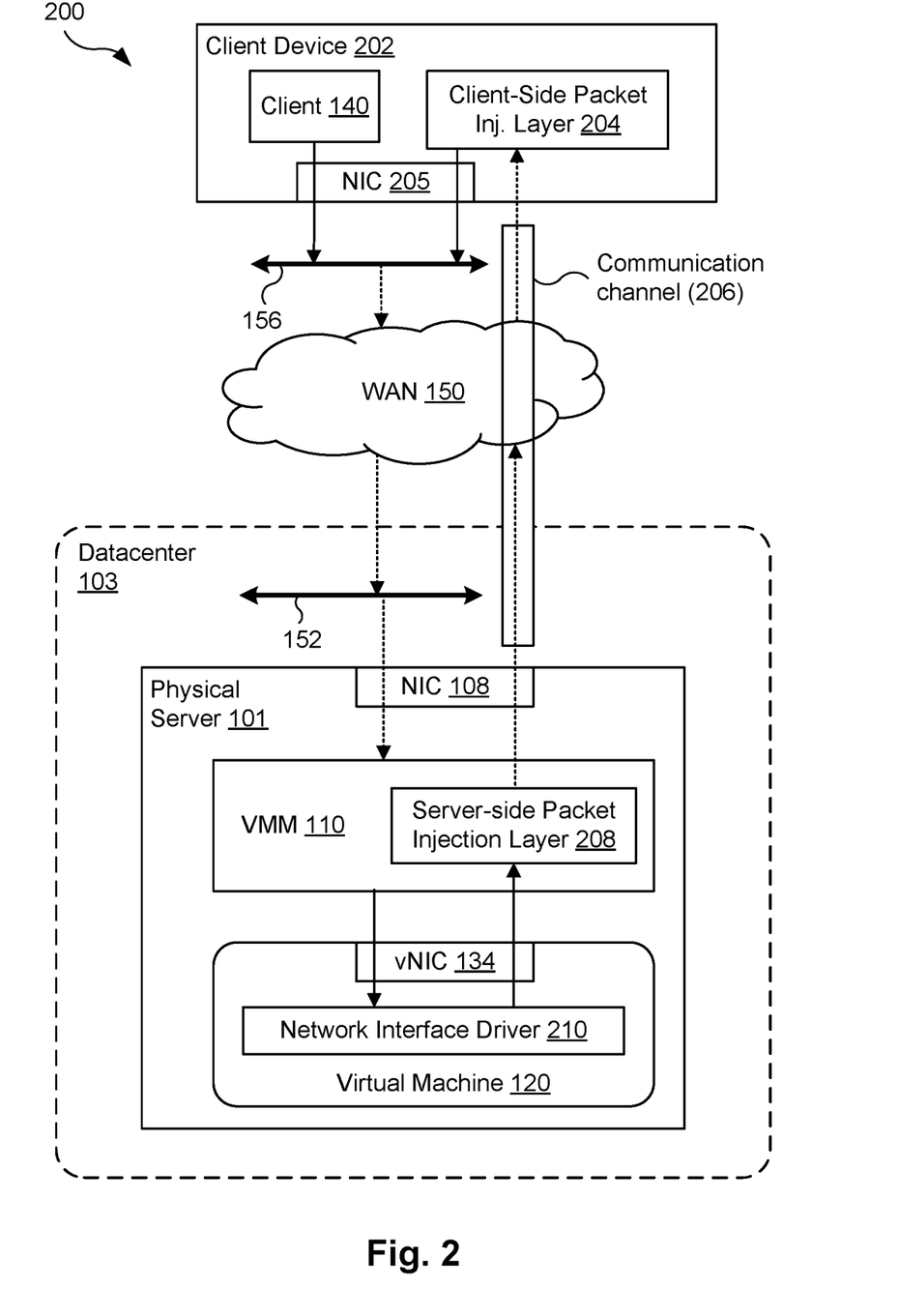
FIG. 2 illustrates a block diagram of a system for exchanging network traffic between a client and a server-side virtual machine across a wide area network according to an exemplary aspect.

FIG. 2 illustrates a block diagram of a system 200 for exchanging network traffic between a client and a server-side virtual machine across a wide area network 150 according to an exemplary aspect. In the aspect shown, the system 200 includes a client device 202 having a client module 140 and a client-side packet injection layer 204. The client device 202 may be a computing device similar to the physical server 101, as described earlier, having system hardware components (not shown) that includes a physical network interface controller (e.g., NIC 205), also known as a network interface card, network adapter, LAN adapter, or a physical network interface.

The client 140 may communicatively interact with the server 101. In particular, among these interactions, the system includes a communication channel 206 through which the client 140 transmits packets to the virtual NIC 134. In some exemplary aspects, the client 140 may access the VM 120 using the physical NIC 205 of the client device to send one or more requests through the client network 156, the WAN 150, and ultimately, the datacenter network 152. The requests flowing through the datacenter network 152 may be picked up by the physical NIC 108 of the physical server 101, and internally routed to the VM 120 through the virtual NIC 134.

The client-side packet injection layer 204 may be communicatively connected to a server-side packet injection layer 208 via a communication channel 206 established between the corresponding packet injection layer components. In some exemplary aspects, the communication channel 206 may be implemented using a wired network connection, or may include a wireless network connection, including connections using the Bluetooth™ protocol, IRport™, Airplay®, or other wireless protocols. In some aspects, the communication channel 206 may be a data stream, such as a TCP connection.

The system 200 further includes a VMM 110 having a server-side packet injection layer 208 and a network interface driver 210 executing in a VM 120 in the datacenter 103. The network interface driver 210 may be a guest-level module (e.g., installed in the guest OS 122 as driver software) configured to handle the transmission and receipt of network packets from the guest OS 122 or other applications executing in the VM 120, referred to herein as guest network packets. In some aspects, the server-side packet injection layer 208 may interact with the communication channel 206 as well as with the datacenter network 152, and as such receives packets from the guest.

In one exemplary aspect, the server-side packet injection layer 208 may be configured to handle guest network packets detected and intercepted by the network interface driver 210. For example, the network interface driver 210 may load a new network packet into a send queue of the virtual NIC 134 and signal (e.g., using a bit register of the virtual NIC 134) accordingly. Changes to the virtual NIC 134 trigger an event (e.g., VM-EXIT) that switches process control from the guest OS to the VMM 110, which passes the guest network packet to the server-side packet injection layer 208. In other implementations, the server-side packet injection layer 208 may receive the guest network packet using an API interface exposed by the VMM 110 and used by the network interface driver 210 at the guest operating system level to explicitly pass the guest network to the layer 208. In other embodiments, the server-side packet injection layer 208 may use other techniques known in the arts for network packet sorting, for example, such as the technique described in U.S. Pat. No. 9,008,097 B2, "Network interface controller supporting network virtualization" or by using other techniques known in the prior art. In some exemplary aspects, the server-side injection layer 208 may be configured to pack the guest network packets into the communication channel 206 established between the client-side and server-side packet injection layers 204, 208.

In some aspects, the packet injection layers 204, 208 are configured to perform packet encapsulation to stream guest network packets using the communication channel 206. For example, in one implementation, the server-side injection layer 208 may use a transmission scheme of two bytes of packet size, then followed by Ethernet packet data, repeatedly, and so forth. In some ways, each of the packet injection layers 204, 208 are configured to process packets from host A, and signal receipt of packets to host A. They can be configured to send and receive packets within a real network, or transfer packets to another packet injection layer. The packet injection layer may modify packets, or send them as-is.

In one exemplary aspect, the client-side packet injection layer 204 may be configured to unpack the guest network packets from the communication channel 206 and inject the guest network packets into a physical network interface of the client device 202. The client 140 is configured to receive network traffic from the VM 120 as if the traffic arrived at the client network 156, similar to the topology 100A. Accordingly, the server-side local network (e.g., datacenter network 152) is kept isolated from network access by the VM 120, and all VM connections to the client network 156 go through the client device's physical NIC. In some aspects, the behavior of the packet injection layers is fully symmetrical. That is, if there are some packets in the client's network card 205, they will be transmitted via the communication channel 206 and received by the server-side VM 120.

In general, the term "module" as used herein can refer to a software service or application executed as part of the guest operating system 122 or the VMM 110. However, in general, the term module can be considered to be executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

Moreover, in general, it should be appreciated that the disclosed system and method is described herein in the context of a hosted virtualized computing system. However, in alternative aspects, the system and method may be implemented for a non-hosted virtualized computer system, and may also be implemented directly in a computer's primary OS, both where the OS is designed to support virtual machines and where the OS does not support virtual machines.

Figure 3:
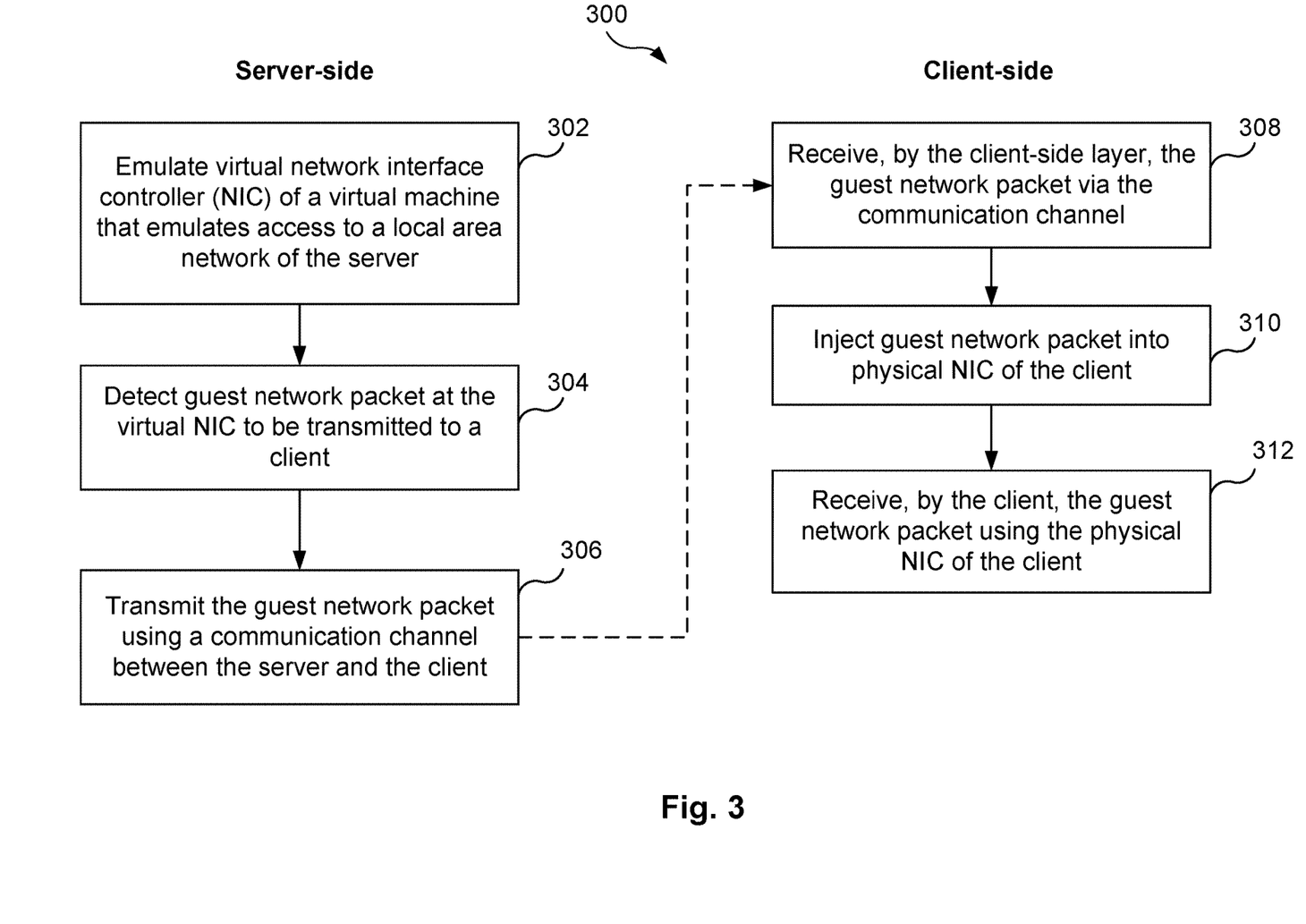
FIG. 3 illustrates a flowchart of a method for exchanging network traffic between a client and a server-side virtual machine across a wide area network according to an exemplary aspect.

FIG. 3 illustrates a flowchart of a method 300 for exchanging network traffic between a client and a virtual machine according to an exemplary aspect. It is noted that the following description of the exemplary method makes reference to the system and components described above.

At step 302, the VMM 110 emulates a virtual NIC 134 of a virtual machine 120 executing on a physical computing device (e.g., server 101). The virtual MC 134 emulates access to a physical local area network (e.g., networks 152, 154) of the physical computing device. In some exemplary aspects, the physical local area network is isolated from network access by the virtual machine. In some exemplary aspects, the VMM 110 establishes the communication channel 206 between a server-side packet injection layer 208 executing on the physical server 101 and a client-side packet injection layer 204 executing on the client device 202. In some exemplary aspects, the VMM 110 establishes the communication channel 206 in response to the client 140 initiating a VM session with a VM 120 running in the datacenter 103.

At step 304, the VMM 110 detects a guest network packet at the virtual NIC to be transmitted to the client 140. In some exemplary aspects, the VMM 110 intercepts a request to access a state of the virtual NIC 134 by a network interface driver 210 executing in the virtual machine. The network interface driver 210 running in the VM 120 may write a new network packet to a send queue of the virtual NIC 134 and access a register of the virtual NIC 134 to signal that the new guest network packet has been placed in the send queue. In exemplary aspects implementing a trap and emulate approach, the changes to the virtual NIC 134 may trigger an event (e.g., VM-EXIT) that switches control from the guest OS to the VMM 110, which passes the guest network packet to the server-side packet injection layer 208. In another exemplary aspect using a para-virtualization approach, the VMM 110 implements an interface which is used by the network interface driver 210 at the guest operating system level to pass the guest network to the server-side packet injection layer 208.

At step 306, the server-side packet injection layer 208 transmits the guest network packet to the client using a communication channel 206 between the physical server and the client without injecting the guest network packet into the local area network of the physical server. In some exemplary aspects, the server-side packet injection layer 208 transmits the one or more guest network packets having a destination address for the client 140 using a tunneling protocol. The server-side packet injection layer 208 may encapsulate the guest network packets into the payload regions of network traffic within the communication channel 206. In this way, the server-side packet injection layer 208 transmits the guest network packet without exposing the packet to the local area network 152 of the datacenter 103 because the networking devices of the datacenter do handle routing the guest network packet according to the destination addresses of the guest network packet itself.

At step 308, the client-side packet injection layer 204 receives the guest network packet via the communication channel 206. In some exemplary aspects, the client-side packet injection layer 204 extracts the guest network packet, including the original destination and source address fields, from the payload region of network traffic in the communication channel 206.

At step 310, the client-side packet injection layer 204 injects the guest network packet into the physical NIC 205 of the client. In some exemplary aspects, the client-side packet injection layer 204 inserts the guest network packet directly onto a receive queue of the NIC 205. The client-side packet injection layer 204 may signal to the NIC 205 that a new network packet is waiting in the queue. In response, at step 312, the client 140 receives the guest network packet using the physical 205 of the client device 202.

Figure 4A:
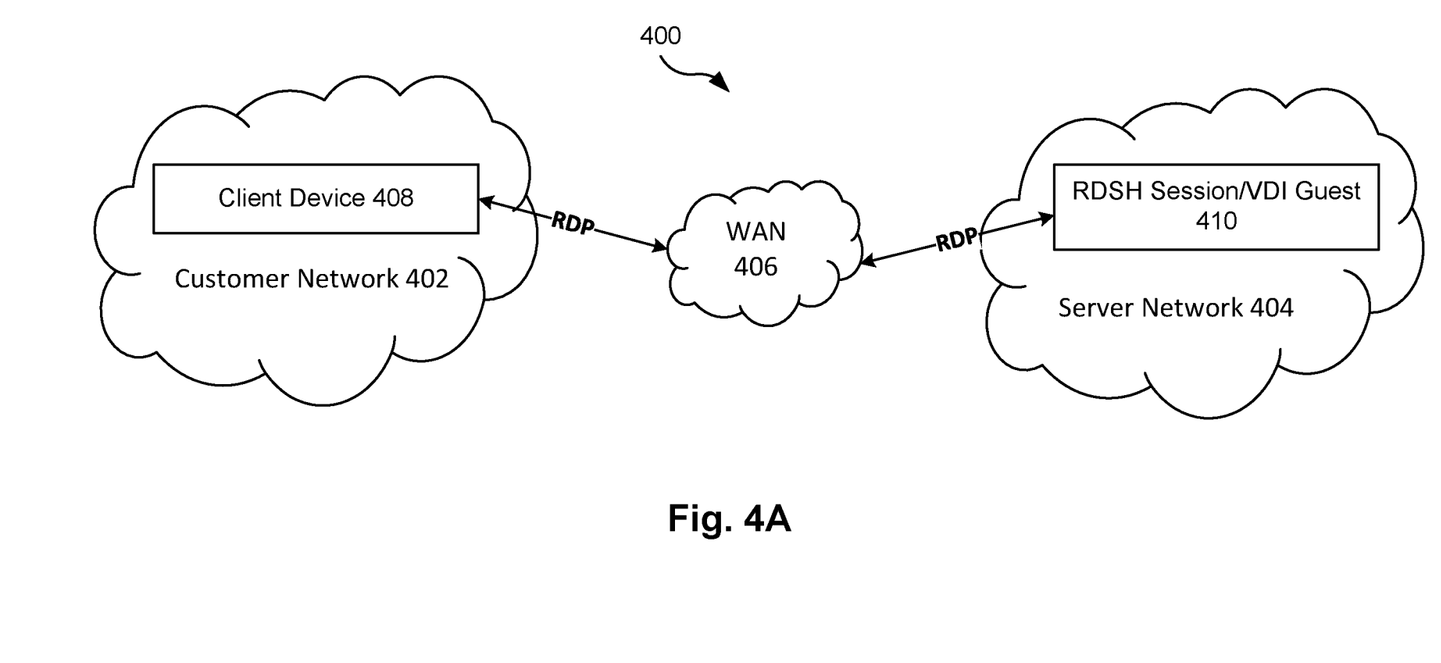
FIG. 4A illustrates a block diagram of a system for communicating with a server-side virtual machine across a wide area network through a client device, according to an exemplary aspect.

FIG. 4A illustrates a block diagram of system 400 for communicating with a server-side virtual machine across a wide area network through a client device, according to an exemplary aspect.

In system 400, client device 408 may be a personal computer, a smartphone, etc., that is within customer network 402. Customer network 402 may comprise a plurality of client devices that are connected to one another (e.g., via a local area network (LAN)). Virtual desktop infrastructure (VDI) may be used to create a virtualized desktop environment on a remote server that a remote client can access. VDI guest 410 may be a virtual machine that client device 408 is remotely accessing. In some aspects, guest 410 may be remote session 410 on a remote desktop session host (RDSH). Session/guest 410 may reside on a remote server that is connected to server network 404. Server network 404 may also comprise a plurality of servers that are connected to one another (e.g., via a local area network (LAN)). Client device 408 and session/guest 410 may communicate using remote desktop protocol (RDP), which is a protocol that provides users with a graphical interface for connecting to another computer over a network connection. In this specific case, client device 408 may connect to session/guest 410 over WAN 406 (e.g., the Internet). In the context of FIG. 1a, client device 408 may be client 140, customer network 402 may be client network 156, WAN 406 may be WAN 150, server network 404 may be datacenter network 152, and session/guest 410 may be with VM 120.

Figure 4B:
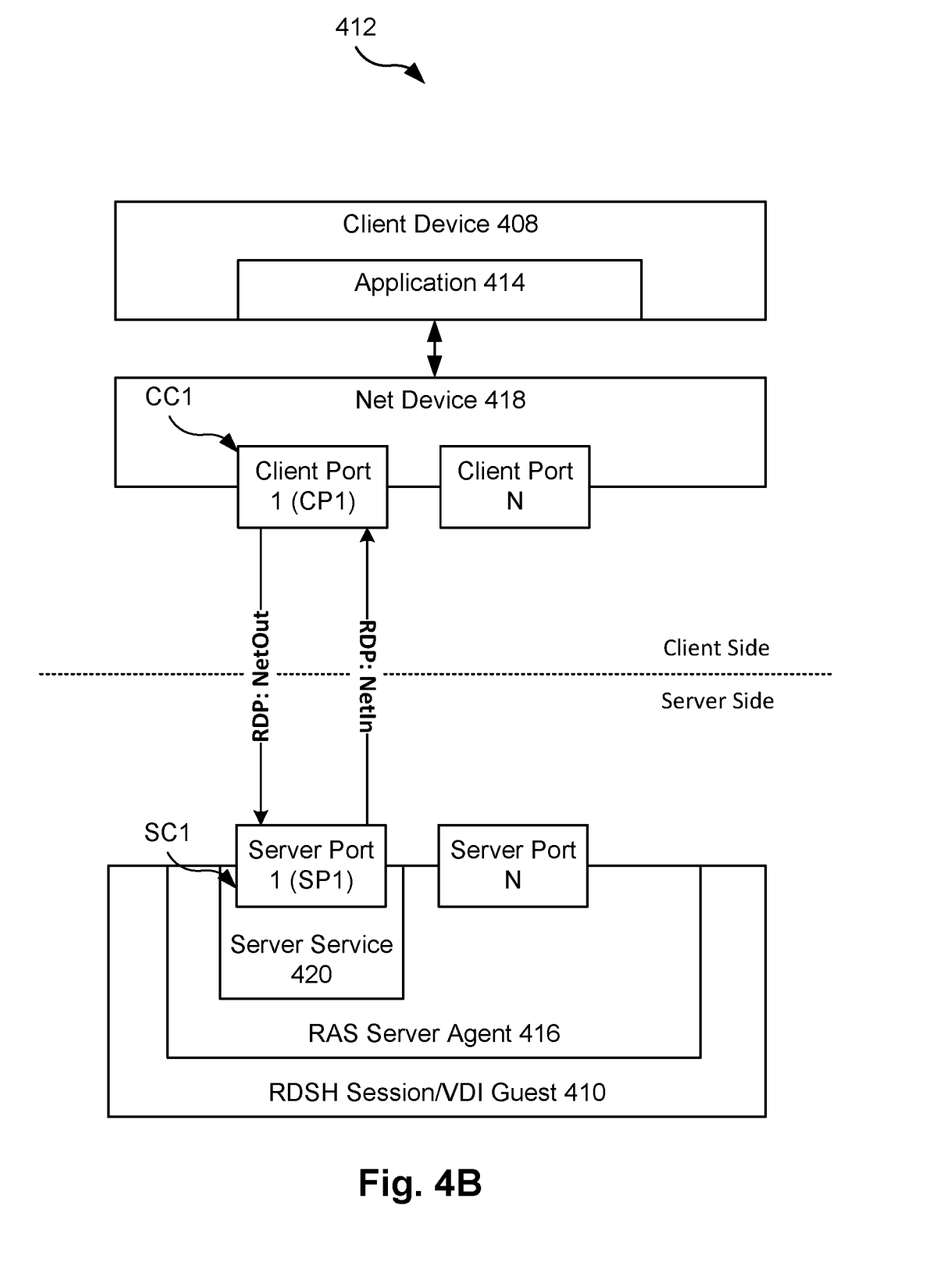
FIG. 4B illustrates a block diagram illustrating a network topology of the system in FIG. 4A, according to an exemplary aspect.

FIG. 4B illustrates a block diagram illustrating a network topology 412 of the system in FIG. 4A, according to an exemplary aspect.

As discussed previously, there is a need for allowing a remote desktop to be part of a client network environment, and a client device to be a part of a remote network environment. Remote access service (RAS) is a combination of hardware and software that enables a connection between a device (e.g., a RAS client) and a host computer (e.g., a RAS server). System 412 depicts a case for RAS server-to-RAS client ports redirection.

Net device 418 is a device in the same network (e.g., a LAN) as client device 408. Net device 418 may be a network scanner, network printer, an Internet Small Computer Systems Interface (iSCSI) storage device, or any other device capable of communicating with client device 408. In some aspects, net device 418 may be an internal network component of client device 408. Net device 418 serves as an abstract service in customer network 402 and has the purpose of connecting running applications on the server side (i.e., the RAS Server) with the local network service.

The RAS client (e.g., client device 408 and net device 418) listens for data on the client-side via a network port (e.g., client port 1 (CP1)) of net device 418. It should be noted that net device 418 may have a plurality of network ports (e.g., client port 1, 2, . . . N). Different applications of client device 408 may use different ports of net device 418 to connect to the server side. For example, application 414, which may be a local application on client device 408, may attempt to connect to the server side. Accordingly, application 414 may be configured to establish a connection CC1 with CP1. In some aspects, application 414 may establish CC1 by network protocols, such as TCP/UDP, via a programming interface of an operating system on client device 408.

On the server side exists server service 420 on port SP1 of RDSH session/VDI guest 410. Application 414 may specifically attempt to connect to service 420 on the port SP1. Accordingly, client device 408 directs all communication requests of application 414 to RAS server agent 416 using RDP via virtual channels "netOut" and/or "netIn." RAS server agent 416 runs inside RDSH/VDI guest 410, and is connected to the RAS Server. RAS server agent 416 is configured to install and setup a network interface, collect network data and put the data into an appropriate RDP channel. Subsequently, RAS Agent 416 redirects received communication requests to service port SP1. This process refers to port redirection, in which all communication requests to CP1 are redirected to SP1 inside an RDP connection between the RAS Client (i.e., client device 408) and RDSH/VDI Guest 410. RAS Agent 416 processes the RDP channels "netOut", "netIn", and implements counterpart algorithms to RAS Client for port redirection.

In one example, a network software on a remote server may publish a service (e.g., server service 420) on a port (e.g., SP1) as a database sink port and determine a session identifier (ID) of any new connection to the published SP1. Net device 418 may transfer data of application 414 from the client side to server service 420. In order to do so, client device 420 listens for data on port CP1 (where Application 414 sends application data) and makes remote service available in the local network with net device 418. Net device 418 reads all data from CP1 and wraps the data based on a network protocol in order to send data into the RDP virtual channel "netOut."

On the server-side, RAS server agent 416 comprised in session/guest 410 reads data from "netOut" and sends the data to server service 420. RAS server agent 416 may specifically establish a connection SC1 to server port 1 (SP1) in order to send data to or receive data from application 414.

In a backwards scenario (i.e., sending data back to application 414), RAS server agent 416 may, for example, accept data from the server-side port of SC1 and send data originating from server service 420 into the RDP virtual channel "netIn." Subsequently, net device 418 may read the data of server service 410 from RDP channel "netIn" and resend the read data into connection CC1. Net device 418 specifically unpacks the read data from the RDP virtual channel and sends the data into the port attached to application 414 (e.g., CP1).

Accordingly, these cases allow the use of applications that require access to specific network devices, or specific network ports on client/server side without any special customer actions; all services and data sent/received are from an authorized RDP session.

Figure 5:
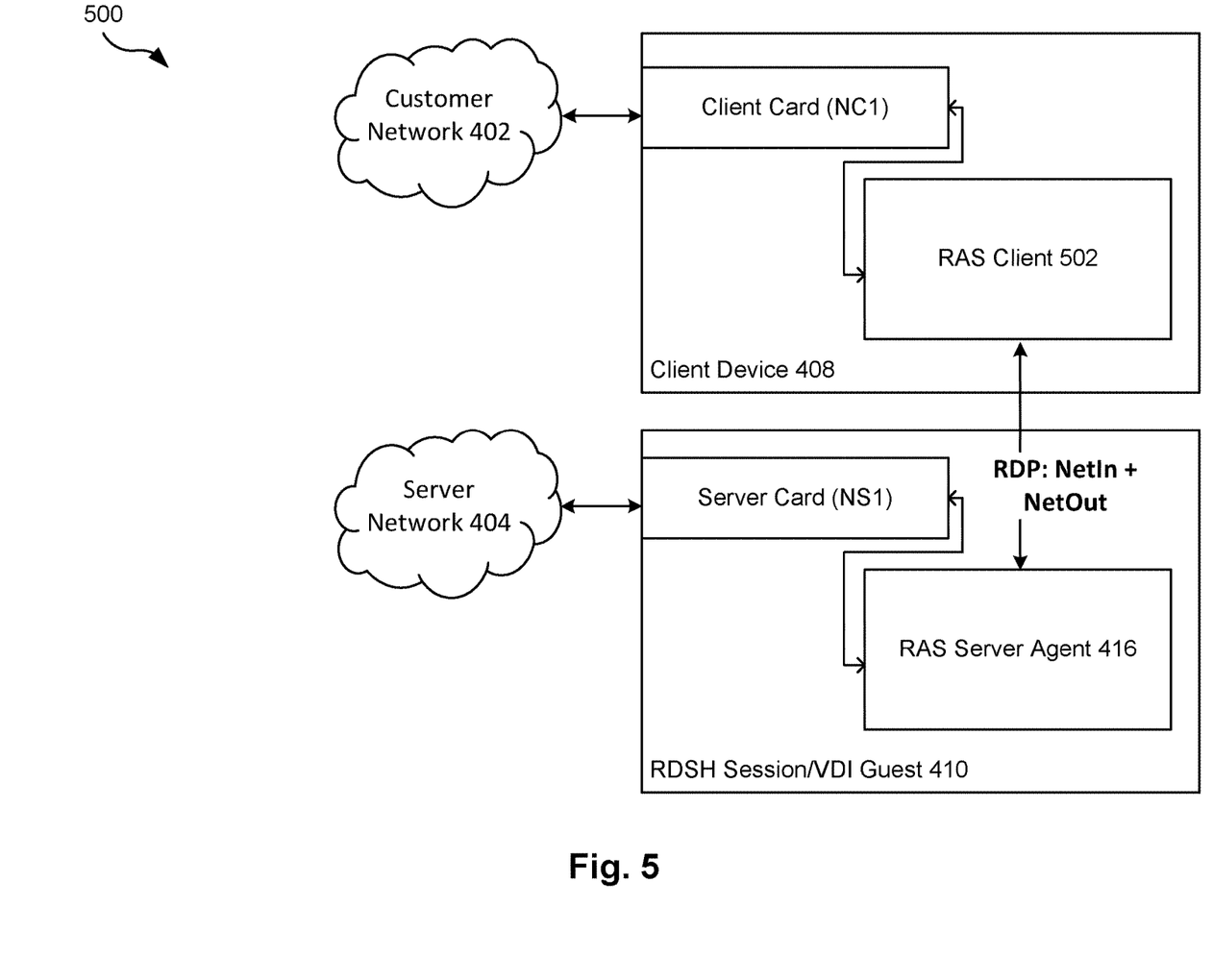
FIG. 5 illustrates a block diagram of a system for enabling network redirection using virtual network adapters, according to an exemplary aspect.

In some aspects, however, new ports (e.g., server port N and client port N) are dynamically created such that Application 414 should continue data exchange to a new port by a new connection—but the port is unknown for RAS software. FIG. 5 illustrates a block diagram of system 500 for enabling network redirection using virtual network adapters, according to an exemplary aspect.

In an exemplary aspect, a logical network adapter is created by a RAS driver on the server (e.g., as server card (NS1)) and on the client (e.g., as client card (NC1)). NC1 and NS1 are software components that allows for the receiving and sending of network packets directed to these network adapters by MAC/IPv4/IPv6 addresses. For example, data could be received from application 414.

NC1 handles (e.g., parses, analyzes, and processes) all received data on the client side and transfers the data to RAS client 502. RAS client 502 encapsulates the data into an RDP channel "netOut." RAS server agent 416 receives data from "netOut," and replaces the MAC address on the data to the MAC address of NS1. RAS server agent 416 places packets into a network driver for adapter NS1. The network driver is a software component that implements internal algorithms of the logical network adapter (e.g., to control and/or operate).

Adapter NS1 issues received data into the OS of the virtual machine running on RAS server agent 416. In other words, NS1 transfers the data to an operating system interface, where the operating system will do any subsequent processing and/or routing of the packets. In some aspects, as a result, a user application on the server side will receive network packets from adapter NS1.

The main task of NS1 and NC1 is to order and transfer all network data from one side to another by a method built on top of RDP. The virtual network adapter on client device 408 (e.g, NC1) is an entry point for external network traffic of customer local network environment (e.g., customer network 402). All packets received on NC1 are transferred by RDP channel (NetIn) into a VDI guest environment (e.g., RDSH session/VDI guest 410), which also has a counterpart virtual network adapter (e.g., NS1). On VDI guest 410, all data received from RDP channel is parsed and redirected into virtual network adapter NS1, and that adapter spreads received packets into VDI environment (e.g., server network 404). In this case, VDI guest 410 receives packets from customer network environment, and applications are running in VDI guest environment will receive packets from customer network environment, thus becoming integrated.

NS1 and NC1 may work in two modes: bridge mode and network address translation (NAT) mode. Bridge mode allows adapters NC1 and NS1 to join physically different networks while MAC address translation and packet transmittal occurs via virtual channels NetIN/NetOut by RDP. These virtual channels use a protocol that provides transmittal of network packets received by virtual adapters NC1/NS1.

In NAT mode, one of the adapters (e.g., either NS1 or NC1) may work in a separated network environment that may restrict access and provide security and privacy by allowing only connections started from one-side-from NS1 or from NC1 (depending on preconditions).

Figure 6:
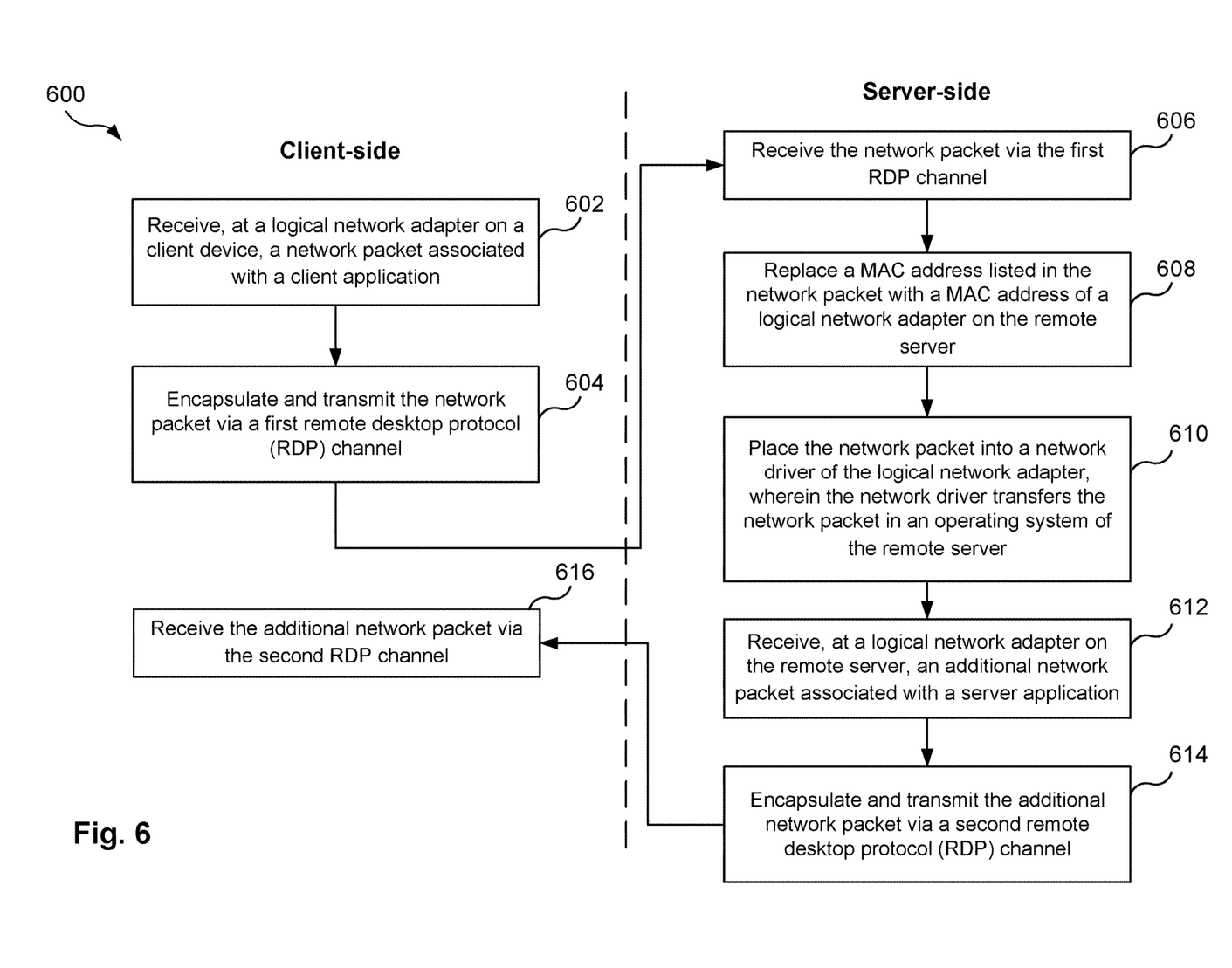
FIG. 6 illustrates a flowchart of a method for seamless remote network redirection according to an exemplary aspect.

FIG. 6 illustrates a flowchart of method 600 for seamless remote network redirection according to an exemplary aspect. At 602, a logical network adapter on a client device (or net device) receives a network packet associated with the client application. At 604, a RAS client on the client device (or net device) encapsulates and transmits the network packet via a first RDP channel. At 606, on the server side, a remote server receives the network packet via the first RDP channel. At 608, a RAS server agent on the remote server replaces a MAC address listed in the network packet with a MAC address of a logical network adapter on the remote server. At 610, the RAS agent places the network packet into a network driver of the logical network adapter, wherein the network driver transfers the network packet in an operating system of the remote server. This enables a server application to gain access to the network packet. The server application may generate its own data in response to receiving the network packet. Accordingly, at 612, the logical network adapter on the remote server receives an additional network packet associated with the server application. At 614, the RAS server agent encapsulates and transmits the additional network packet via a second RDP channel. At 616, the RAS client receives the additional network packet via the second RDP channel.

Figure 7:
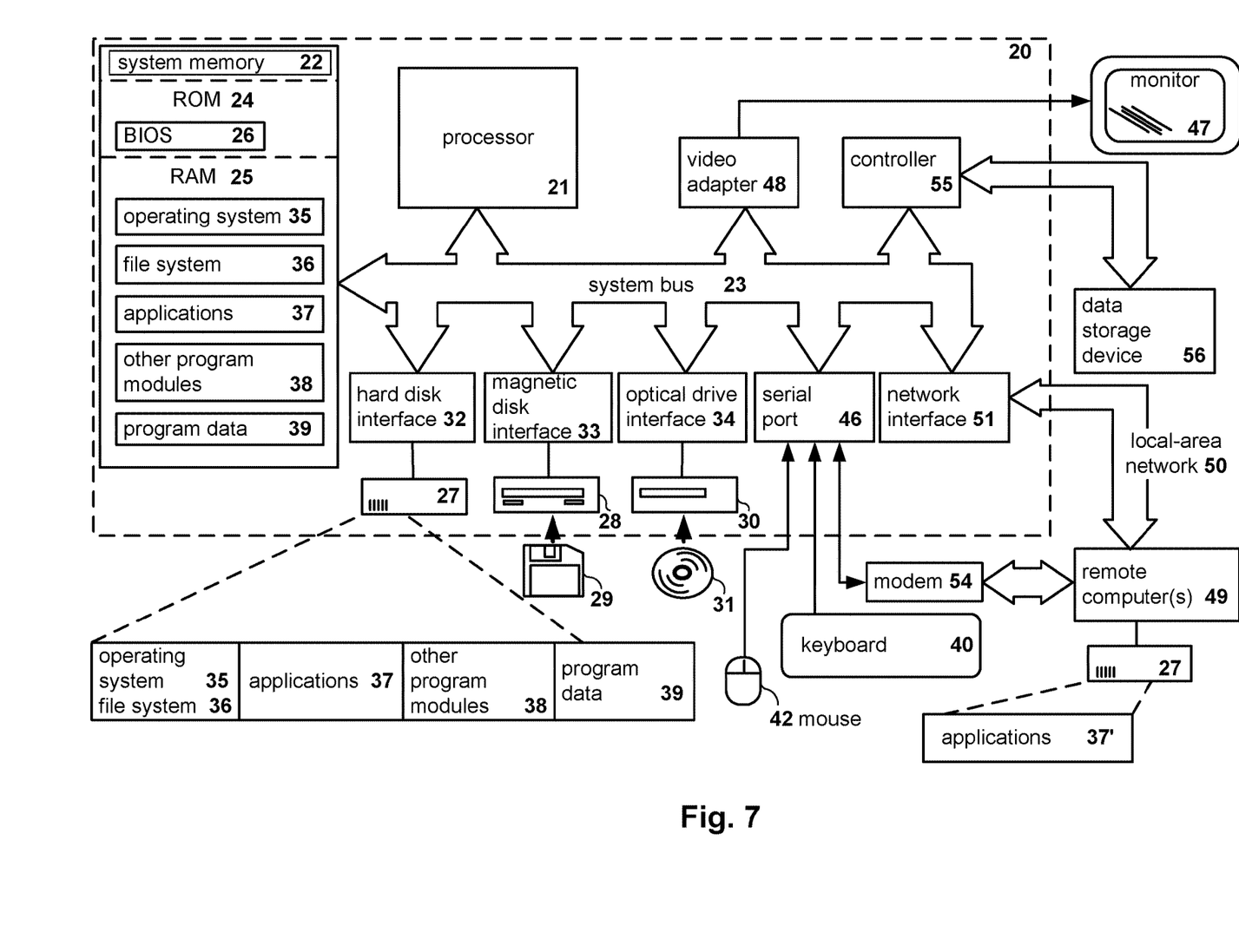
FIG. 7 illustrates a block diagram of a general-purpose computer system on which the disclosed system and method can be implemented according to an exemplary aspect.

FIG. 7 illustrates a block diagram of a general-purpose computer system on which the disclosed system and method can be implemented according to an exemplary aspect. It should be noted that the computer system 20 can correspond to the physical servers 101 and client device 202, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for redirecting network data, wherein the method comprises:

receiving, at a remote server, a network packet via a first remote desktop protocol (RDP) channel, wherein the network packet is encapsulated and transmitted by a client device configured to communicate with the remote server;

replacing a MAC address listed in the network packet with a MAC address of a logical network adapter on the remote server;

placing the network packet into a network driver of the logical network adapter, wherein the network driver is configured to transfer the network packet in an operating system of the remote server such that a server-side application on the remote server gains access to the network packet.

2. The method of claim 1, further comprising
receiving at the logical network adapter a subsequent packet associated with the server-side application in execution upon the remote server; and
encapsulating and transmitting the additional network packet that originates from the server-side application to the client device via a second RDP channel; wherein
the encapsulation and transmission employs the MAC address of the logical network adapter within the stored network packet received from the client device; and
the client device comprises a counterpart logical network adapter that parses the additional network packet for access by a client-side application.

3. The method of claim 2, wherein the transmitting further comprises:
publishing a port on the remote server;
determining a session identifier of a new connection to the published port;
gathering the additional network packet on the published port; and
redirecting the additional network packet into the second RDP channel.

4. The method of claim 1, wherein
the client device comprises a counterpart logical network adapter, and wherein the logical network adapter and the counterpart logical network adapter function in bridge mode such that the logical network adapter and the counterpart logical network adapter can join physically different networks while packet transmittal is handled via the RDP channel.

5. The method of claim 1, wherein
the client device comprises a counterpart logical network adapter, and wherein the logical network adapter and the counterpart logical network adapter function in network address translation (NAT) mode such that one of the logical network adapter and the counterpart logical network adapter will work in a separated network environment with access restrictions that allow only connections that started from an opposite side.

6. The method according to claim 1, further comprising
receiving at the logical network adapter a subsequent packet; and
encapsulating and transmitting the additional network packet to the client device via a second RDP channel; wherein
the encapsulation and transmission employs the MAC address of the logical network adapter within the stored network packet received from the client device; and
the client device comprises a counterpart logical network adapter that parses the additional network packet for access by a client-side application.

7. The method according to claim 1, further comprising
detecting a guest network packet at a virtual network interface controller of the remote server to be transmitted to the client device; and
transmitting the guest network packet to the client device using a communication channel between the remote server and the client device without injecting the guest network packet into the local area network of the remote server.

8. The method according to claim 1, further comprising
detecting a guest network packet at a virtual network interface controller of the remote server to be transmitted to the client device; and
transmitting the guest network packet to the client device using a communication channel between the remote server and the client device without injecting the guest network packet into the local area network of the remote server; wherein
the guest network packet is encapsulated and transmitted as the additional network packet to the client device;
the communication channel is a second RDP channel; and
the encapsulation and transmission employs the MAC address of the logical network adapter within the stored network packet received from the client device.

9. The method according to claim 1, wherein
first remote desktop protocol (RDP) channel is established by a network device in communication with the client device between a port of the network device and a port of the remote server;
the network device is on a same network as the client device;
the network packet encapsulation and transmittal are performed by the network device which provide an abstract service to the network; and
the abstract service connects applications in execution upon the remote server with devices connected to the network of which the client device is one.

10. The method according to claim 1, further comprising
establishing a server agent upon the remote server; wherein
the server agent:
installs and sets up a network interface upon the remote server employing the logical network adapter;
collects data intended for client devices of a network of which the client device is one; and
sends data upon the first RDP channel to a network device upon the network;
the network packet encapsulation and transmittal are performed by the network device which provide an abstract service to the network; and
all subsequent communication requests from the client devices on the network are routed by the server agent through the network interface using the RDP channel.

11. A non-transitory computer readable medium comprising computer executable instructions, the computer executable instructions when executed by one or more microprocessors configure a remote server to execute a process comprising the steps of:
receiving, at the remote server, a network packet via a first remote desktop protocol (RDP) channel, wherein the network packet is encapsulated and transmitted by a client device configured to communicate with the remote server;
replacing a MAC address listed in the network packet with a MAC address of a logical network adapter on the remote server;
placing the network packet into a network driver of the logical network adapter, wherein the network driver is configured to transfer the network packet in an operating system of the remote server such that a server-side application on the remote server gains access to the network packet.

12. The non-transitory computer readable medium according to claim 11, further comprising
receiving at the logical network adapter a subsequent packet associated with the server-side application in execution upon the remote server; and
encapsulating and transmitting the additional network packet that originates from the server-side application to the client device via a second RDP channel; wherein
the encapsulation and transmission employs the MAC address of the logical network adapter within the stored network packet received from the client device; and
the client device comprises a counterpart logical network adapter that parses the additional network packet for access by a client-side application.

13. The non-transitory computer readable medium according to claim 11, wherein the transmitting further comprises:
publishing a port on the remote server;
determining a session identifier of a new connection to the published port;
gathering the additional network packet on the published port; and
redirecting the additional network packet into the second RDP channel.

14. The non-transitory computer readable medium according to claim 11, wherein
the client device comprises a counterpart logical network adapter, and wherein the logical network adapter and the counterpart logical network adapter function in bridge mode such that the logical network adapter and the counterpart logical network adapter can join physically different networks while packet transmittal is handled via the RDP channel.

15. The non-transitory computer readable medium according to claim 11, wherein
the client device comprises a counterpart logical network adapter, and wherein the logical network adapter and the counterpart logical network adapter function in network address translation (NAT) mode such that one of the logical network adapter and the counterpart logical network adapter will work in a separated network environment with access restrictions that allow only connections that started from an opposite side.

16. The non-transitory computer readable medium according to claim 11, further comprising
receiving at the logical network adapter a subsequent packet; and
encapsulating and transmitting the additional network packet to the client device via a second RDP channel; wherein
the encapsulation and transmission employs the MAC address of the logical network adapter within the stored network packet received from the client device; and
the client device comprises a counterpart logical network adapter that parses the additional network packet for access by a client-side application.

17. The non-transitory computer readable medium according to claim 11, further comprising
detecting a guest network packet at a virtual network interface controller of the remote server to be transmitted to the client device; and
transmitting the guest network packet to the client device using a communication channel between the remote server and the client device without injecting the guest network packet into the local area network of the remote server.

18. The non-transitory computer readable medium according to claim 11, further comprising
detecting a guest network packet at a virtual network interface controller of the remote server to be transmitted to the client device; and
transmitting the guest network packet to the client device using a communication channel between the remote server and the client device without injecting the guest network packet into the local area network of the remote server; wherein
the guest network packet is encapsulated and transmitted as the additional network packet to the client device;
the communication channel is a second RDP channel; and
the encapsulation and transmission employs the MAC address of the logical network adapter within the stored network packet received from the client device.

19. The non-transitory computer readable medium according to claim 11, wherein
first remote desktop protocol (RDP) channel is established by a network device in communication with the client device between a port of the network device and a port of the remote server;
the network device is on a same network as the client device;
the network packet encapsulation and transmittal are performed by the network device which provide an abstract service to the network; and
the abstract service connects applications in execution upon the remote server with devices connected to the network of which the client device is one.

20. The non-transitory computer readable medium according to claim 11, further comprising
establishing a server agent upon the remote server; wherein
the server agent:
installs and sets up a network interface upon the remote server employing the logical network adapter;
collects data intended for client devices of a network of which the client device is one; and
sends data upon the first RDP channel to a network device upon the network;
the network packet encapsulation and transmittal are performed by the network device which provide an abstract service to the network; and
all subsequent communication requests from the client devices on the network are routed by the server agent through the network interface using the RDP channel.

* * * * *